US012694748B2

(12) United States Patent
Walsh et al.

(10) Patent No.: US 12,694,748 B2
(45) Date of Patent: Jul. 28, 2026

(54) GAMING DEVICE WITH INDEPENDENT LANDING AWARD ENHANCEMENT SYMBOLS

(71) Applicant: Aristocrat Technologies, Inc., Las Vegas, NV (US)

(72) Inventors: Kevin Walsh, Reno, NV (US); David Marsh, Charlottesville, VA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 285 days.

(21) Appl. No.: 18/368,952

(22) Filed: Sep. 15, 2023

(65) Prior Publication Data

US 2025/0095432 A1 Mar. 20, 2025

(51) Int. Cl.
*G07F 17/32* (2006.01)

(52) U.S. Cl.
CPC ...... *G07F 17/3213* (2013.01); *G07F 17/3244* (2013.01); *G07F 17/3267* (2013.01)

(58) Field of Classification Search
CPC ............. G07F 17/3213; G07F 17/3244; G07F 17/3267
See application file for complete search history.

(56) References Cited

U.S. PATENT DOCUMENTS

| | | | | |
|---|---|---|---|---|
| 7,527,557 | B2 * | 5/2009 | Jackson | G07F 17/34 463/20 |
| 10,586,426 | B2 | 3/2020 | Donelan | |
| 10,643,431 | B2 * | 5/2020 | Chesworth | G07F 17/323 |
| 10,930,117 | B2 | 2/2021 | Moody | |
| 11,328,558 | B2 * | 5/2022 | Sanborn | G07F 17/3211 |
| 2003/0130030 | A1 | 7/2003 | Delott | |
| 2018/0130285 | A1 * | 5/2018 | Ang | G07F 17/3244 |
| 2019/0244481 | A1 * | 8/2019 | Jaffe | G07F 17/34 |
| 2020/0051390 | A1 * | 2/2020 | Jackson | G06Q 50/34 |
| 2022/0051519 | A1 * | 2/2022 | Chan | G07F 17/34 |
| 2023/0005339 | A1 * | 1/2023 | Guerrero | G07F 17/3213 |
| 2023/0005340 | A1 * | 1/2023 | Guerrero | G07F 17/3265 |
| 2023/0073892 | A1 * | 3/2023 | Medford | G07F 17/3209 |
| 2023/0162570 | A1 * | 5/2023 | Cohn | G07F 17/3265 463/20 |
| 2023/0343168 | A1 * | 10/2023 | Milosevich | G07F 17/3267 |
| 2024/0029516 | A1 * | 1/2024 | Colvin | G07F 17/3258 |
| 2024/0212449 | A1 * | 6/2024 | Levesque | G07F 17/3213 |

(Continued)

*Primary Examiner* — Chase E Leichliter
(74) *Attorney, Agent, or Firm* — Armstrong Teasdale LLP

(57) ABSTRACT

A gaming system includes a processor and a memory storing instructions thereon wherein the instructions when executed by the processor, cause the processor to cause display of a matrix including a plurality of symbol positions and populate a first subset of the symbol positions with a first plurality of symbols for a first game instance outcome. The first game instance outcome includes a first award enhancement symbol independently positioned in a first symbol position of the plurality of active symbol positions. The processor further maintains the first plurality of symbols in the first subset for a second game instance outcome and populates a second subset of symbol positions with a second plurality of symbols for a second game instance outcome. The second game instance outcome includes the first award enhancement symbol in the first symbol position in combination with a cash-on-reel symbol from the second plurality of symbols.

20 Claims, 12 Drawing Sheets

(56) References Cited

U.S. PATENT DOCUMENTS

| | | | | |
|---|---|---|---|---|
| 2024/0304062 | A1* | 9/2024 | Leggett | G07F 17/3213 |
| 2025/0087059 | A1* | 3/2025 | Delekta | G07F 17/34 |
| 2025/0095432 | A1* | 3/2025 | Walsh | G07F 17/3244 |

* cited by examiner

GAMING DEVICE WITH INDEPENDENT LANDING AWARD ENHANCEMENT SYMBOLS

TECHNICAL FIELD

The field of disclosure relates generally to electronic gaming devices, systems and methods that provide independent landing of award enhancement symbols during game play.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming system is provided. The gaming system includes a processor and a memory storing instructions thereon wherein the instructions when executed by the processor, cause the processor to cause display of a matrix including a plurality of symbol positions and populate a first subset of the symbol positions with a first plurality of symbols for a first game instance outcome. The first game instance outcome includes a first award enhancement symbol independently positioned in a first symbol position of the plurality of active symbol positions. The processor further maintains the first plurality of symbols in the first subset for a second game instance outcome and populates a second subset of symbol positions with a second plurality of symbols for a second game instance outcome. The second game instance outcome includes the first award enhancement symbol in the first symbol position in combination with a cash-on-reel symbol from the second plurality of symbols.

In another aspect, a non-transitory computer-readable media containing instructions embodied thereon is provided. The instructions, when executed by a processor, cause the processor to cause display of a matrix including a plurality of symbol positions and populate a first subset of the symbol positions with a first plurality of symbols for a first game instance outcome. The first game instance outcome includes a first award enhancement symbol independently positioned in a first symbol position of the plurality of active symbol positions. The processor further maintains the first plurality of symbols in the first subset for a second game instance outcome and populates a second subset of symbol positions with a second plurality of symbols for a second game instance outcome. The second game instance outcome includes the first award enhancement symbol in the first symbol position in combination with a cash-on-reel symbol from the second plurality of symbols.

In yet another aspect, a method of implementing a game is provided. The method includes causing display of a matrix including a plurality of symbol positions and populating a first subset of the symbol positions with a first plurality of symbols for a first game instance outcome. The first game instance outcome includes a first award enhancement symbol independently positioned in a first symbol position. The method further includes maintaining the first plurality of symbols in the first subset for a second game instance outcome and populating a second subset of symbol positions with a second plurality of symbols for a second game instance outcome, the second game instance outcome including the first award enhancement symbol in the first symbol position in combination with a cash-on-reel symbol from the second plurality of symbols.

DETAILED DESCRIPTION

Figure 1:
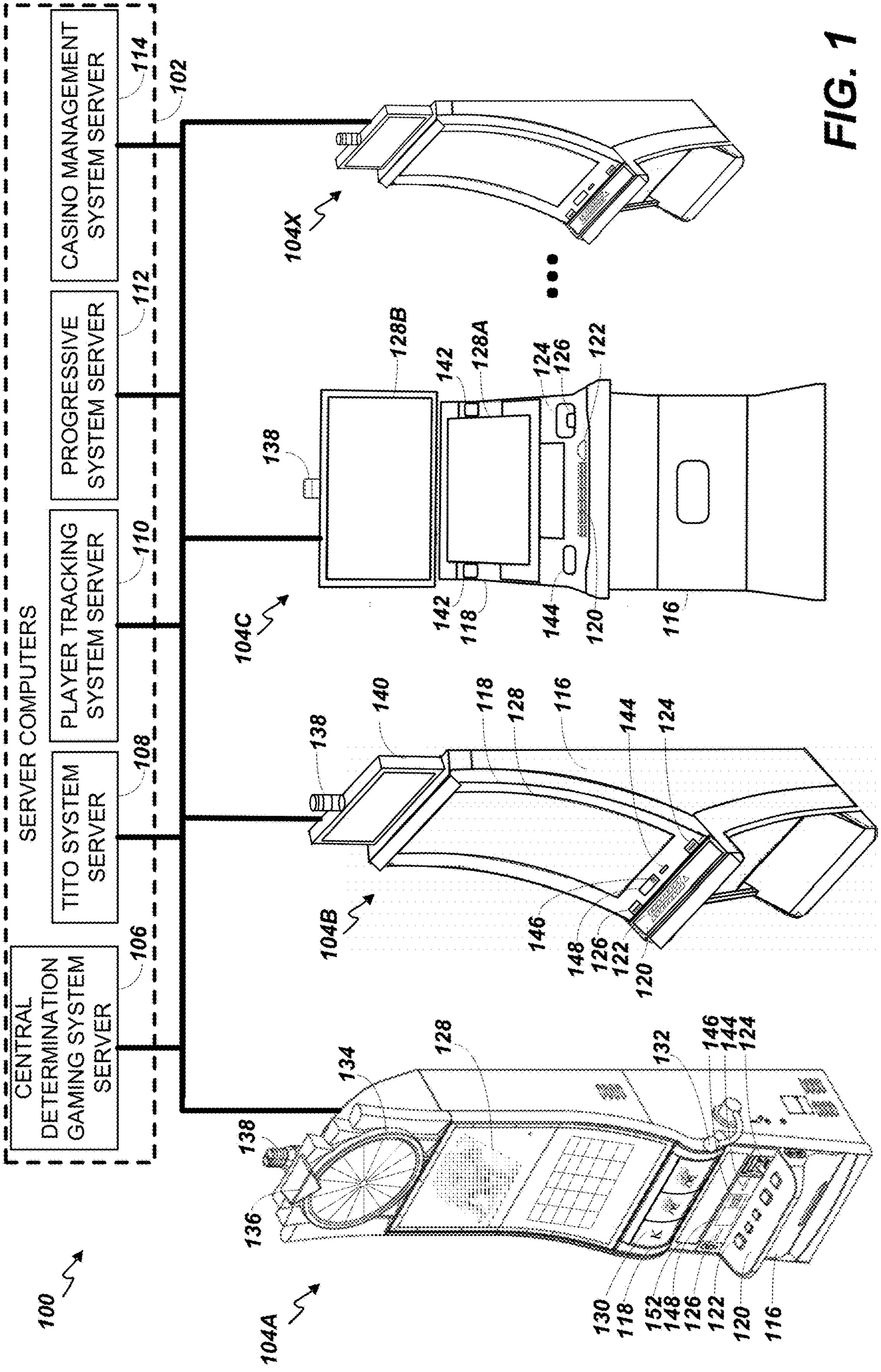
FIG. 1 is an exemplary diagram showing several gaming machines networked with various gaming related servers.

Described herein are systems and methods for feature games that include independently landing award enhancement symbols in electronic gaming. An electronic game is provided including symbols provided within a plurality of symbol positions. For each spin of the game, the symbol positions are populated based on a simulated spinning of reels to include one of a cash-on-reel ("COR") symbol, an award enhancement symbol (e.g., a multiplier symbol that increases a value of the COR symbol by a multiplier), and blank symbols. The COR symbols and the award enhancement symbol persist in their landed symbol positions throughout the feature game. On subsequent spins, new COR symbols may only land in symbol positions that are not already occupied by a previously landed COR symbol. At an end of the feature game, a credit award is provided. The credit award is associated with the displayed COR symbols and award enhancement symbols in each of the symbol positions. For example, each award enhancement symbol represents a multiplier to be applied to a value of a COR symbol that is in the same symbol position.

The technical problems addressed herein include: (i) inability of known systems to provide display variance in accumulating COR symbols corresponding to a credit award; (ii) inability of known systems to provide award enhancement symbols, such as multiplier symbols, to land in a symbol position independent of a base symbol or symbol combination that the award enhancement symbol affects; (iii) inability of known systems to provide a persistence mechanic, where independently landing award enhancement symbols may persist in a symbol position between spins and a base symbol, such as a COR symbol, is added to the symbol position on a subsequent spin; (iv) inefficient use of computer resources in known gaming systems at least because of burdensome processing requirements when determining displayed game outcomes; and (v) lack of processing availability and speed in known gaming systems at least because of the burdensome processing requirements.

The resulting technical effect and/or technical benefits achieved herein include at least one of: (i) ability to provide display variance in accumulating COR symbols corresponding to a credit award by causing display of independently landing award enhancement symbols; (ii) ability to provide award enhancement symbols to land in a symbol position independent of a base symbol or symbol combination that the award enhancement symbol affects; (iii) ability to provide a persistence mechanic, where independently landing award enhancement symbols may persist in a symbol position between spins and a base symbol, such as a COR symbol, is added to the symbol position on a subsequent spin; (iv) improved efficiency in the use of computer resources by performing a lookup of displayed game outcomes; and (vi) improved processing availability and speed at least because of the improved efficiency in the use of computer resources.

The description provided herein includes certain examples and exemplary use cases. It should be understood that these examples and use cases are included herein for illustrative purposes, and these examples and use cases should not be taken to limit the present disclosure. The systems and methods described herein may be used in many other use cases.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
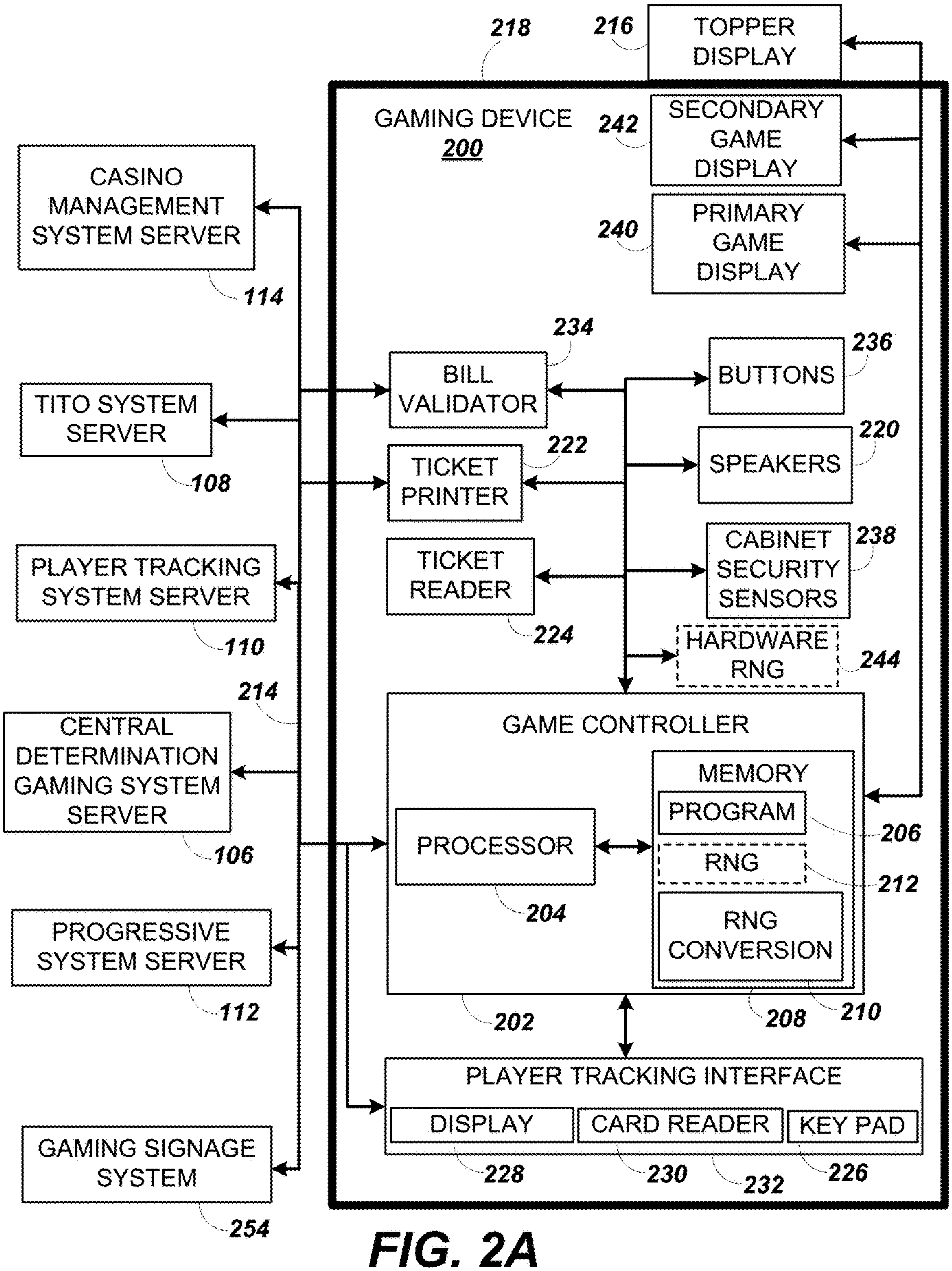
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
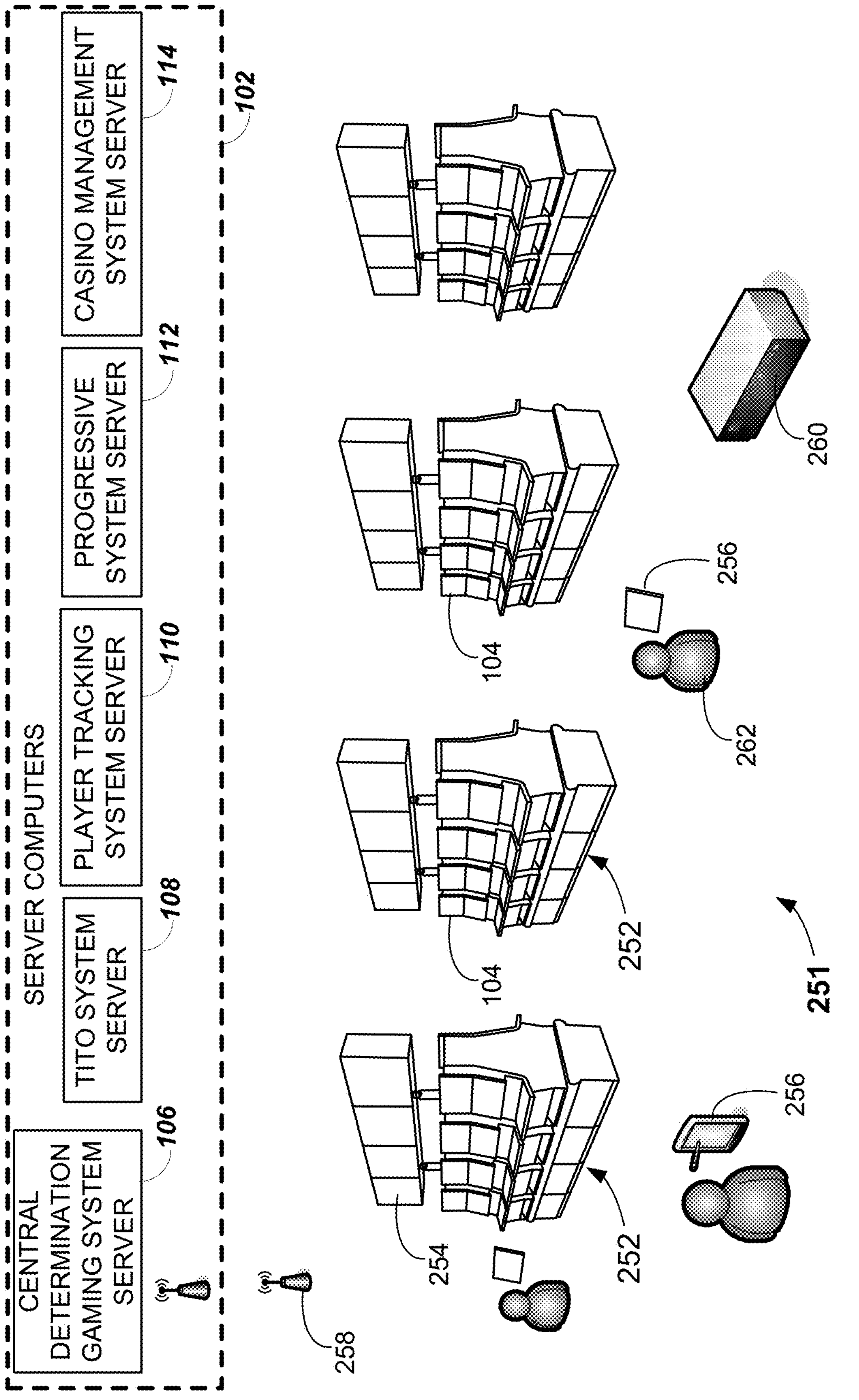
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
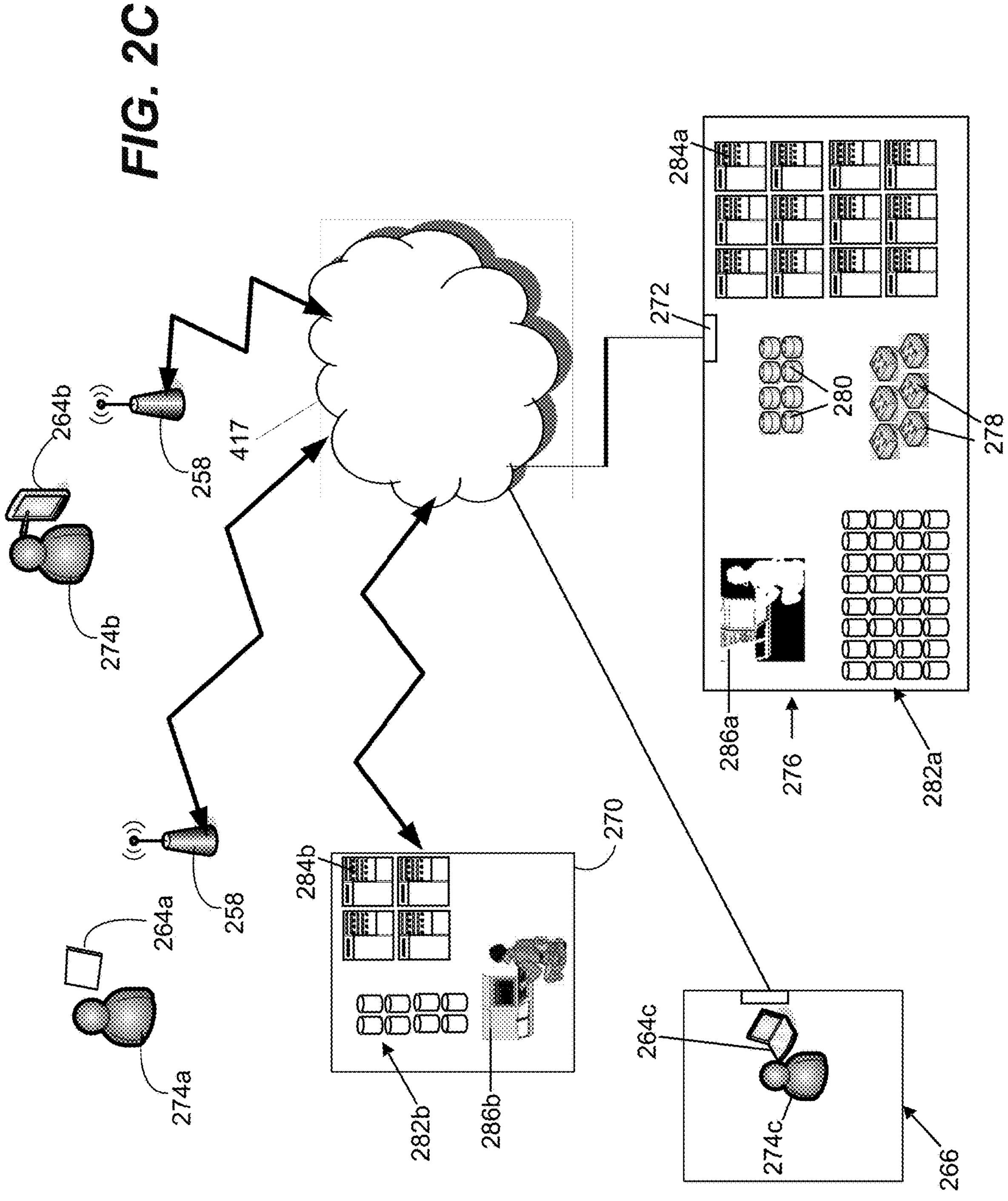
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as “apps” and downloadable by authorized users.

Figure 3:
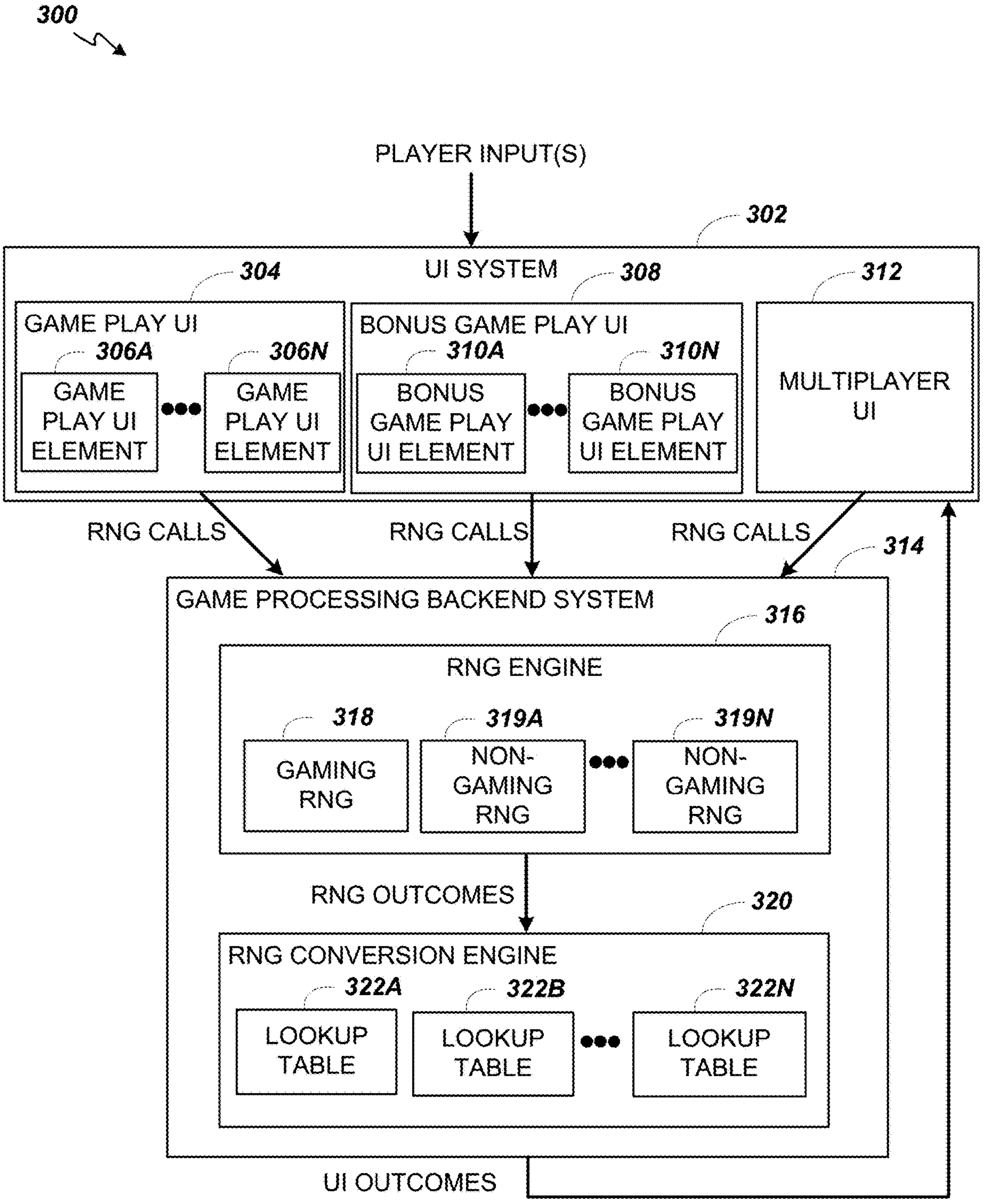
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical “spin” button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player’s gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
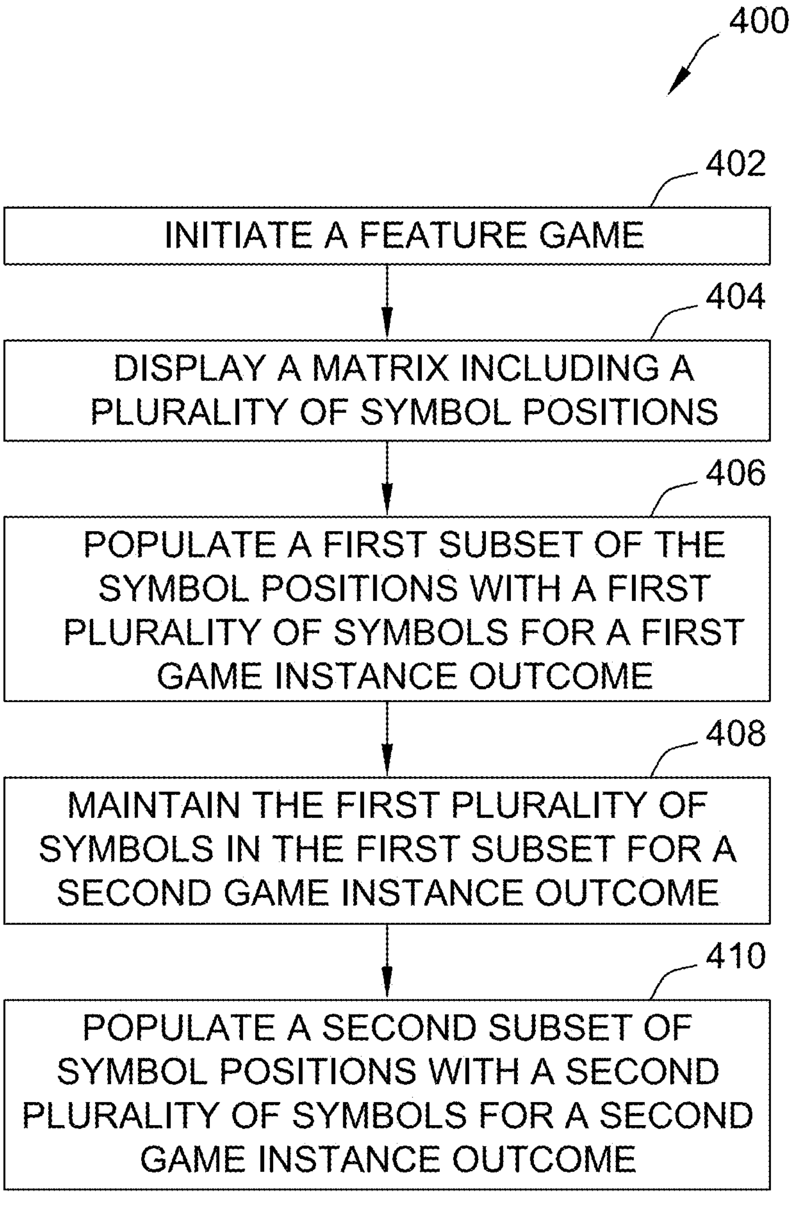
FIG. 4 is a flow chart of a process for executing electronic game play for display to a user on a gaming device, such as a gaming device similar to the gaming device of FIG. 1.
Figure 5:
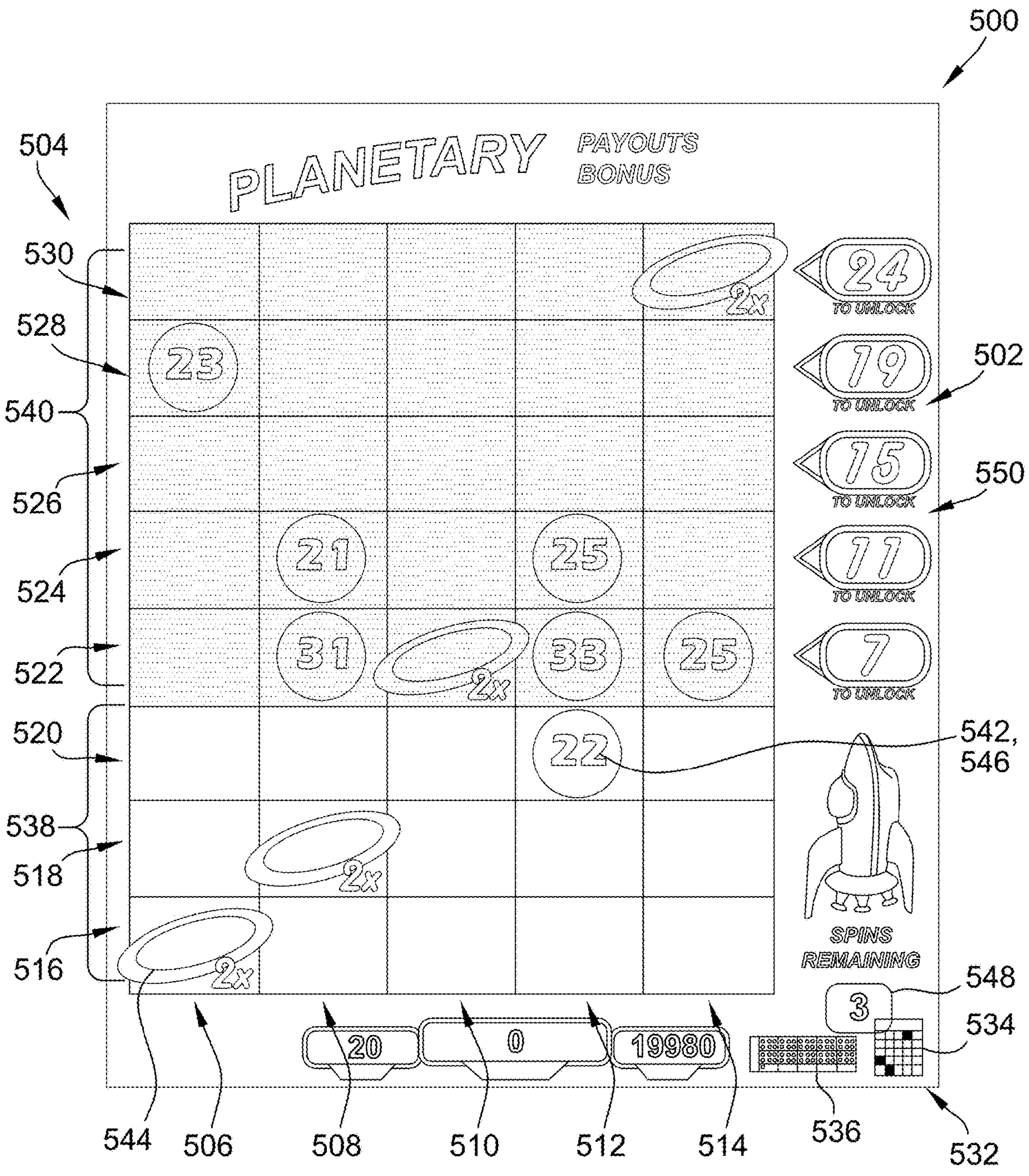
FIG. 5 is an example screen display showing display of a feature game according to the process of FIG. 4, prior to initiating a first game instance.

FIG. 4 is a flow chart of an example process 400 for executing electronic game play for display to a user. FIG. 5 shows a schematic of an example game display 500, which may be displayed by mobile gaming devices 256 or on any gaming device similar to gaming devices 104A-104X, shown in FIG. 1. The game display 500 of FIG. 5 shows a display provided during the feature game prior to initiating a first spin (alternatively referred to herein as "game instance") of the feature game.

In the example embodiment, the game includes a base game and a feature game. The base game is an electronic slot game in which a plurality of symbol positions are displayed to a user (e.g., in a plurality of reels). The processor 204 configures play of the game based on a set of instructions stored in the memory 208.

Referring to FIG. 4, at a first step 402, a feature game is initiated. In the example embodiment, the game is a "free-spins" feature game that may be triggered during and/or based on play of a base game. In some embodiments, the feature game is triggered based on play of a base game, such as in response to a player accumulating one or more collectible tokens during play of the base game.

In the example embodiment, the electronic game shown in FIGS. 5-10 is a Class II bingo game. A primary game display area 502 includes the matrix 504 that includes a plurality of columns 506-514 and a plurality of rows 516-530. While five columns 506-514 and eight rows 516-530 are shown in the example of FIG. 5, in some examples, more or fewer columns and/or rows may be used. As shown, the matrix 504 includes a plurality of symbol display positions for presenting symbols (and/or symbol combinations).

In the example of FIG. 5, a secondary game display area 532 includes a bingo card 534 and a bingo number listing 536. As shown, bingo card 534 includes a matrix of bingo cells (e.g., squares). In some examples, the matrix may be a 5×5 matrix of 25 total cells. In some examples, bingo card 534 may have a matrix of a different size (e.g., 3×3, 4×4, 4×5, 4×6, 6×6, 7×7, 3×8, 10×10, etc.). In some examples, the matrix may be larger or smaller. In the example of FIG. 5, each cell in the matrix of bingo card 534 includes a number that is not repeated in any other cell of bingo card 534.

In some examples, the bingo game may be a networked game that involves two or more networked devices, such as gaming devices 104A-104X. For example, many electronic bingo games may be required, by state gaming regulations, to include at least two players. As a result, in these circumstances, a bingo game can only occur if two or more players have placed wagers and received a bingo card to be used to determine a game outcome against a common ball call. A ball call may be initiated once at least two players have joined an electronic bingo game (e.g., a networked electronic bingo game), and each player's bingo card (or cards) are compared to the same ball call, even where the players are physically separated, such as in different parts of a casino or even in different casinos/external locations.

Central determination gaming system server 106 may manage (and/or host) the bingo game, such as by generating bingo card 534 (or cards, as above) and/or bingo number listing 536. In some examples, bingo card 534 (and/or information on which the bingo card 534 is based), and/or the bingo number listing 536 may be generated using an RNG (e.g., RNG 318). In some examples, bingo card 534 may be randomly selected from a set of bingo cards or a player may select their own bingo card 534 (e.g., via a user interface), such as from a set of randomly generated bingo cards, for example.

In operation, a player and/or gaming device may be provided with a respective bingo card 534, such as by central determination gaming system server 106. For example, a player may be provided a new bingo card 534 each time a "Spin" or "Play" button is pressed by the player (e.g., via a user interface), provided the player has made a wager/input. In some examples, more than one bingo card 534 may be generated in response to a wager. Bingo number listing 536 (e.g., "ball call") may be randomly generated, such as by central determination gaming system server 106. Bingo card 534 may be compared to bingo number listing 536, and the numbered cells on bingo card 534 that match numbers in the bingo number listing 536 may be marked or "daubed" on bingo card 534. Finally, the marked or daubed bingo card 534 may be evaluated against a paytable of winning bingo patterns.

Bingo number listing 536 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in bingo number listing 536. Other game-ending patterns are also possible. When the game-ending pattern is awarded, bingo number listing 536 is reset, for all players participating in the bingo game and the process repeats. In some examples, a single play of the bingo game includes a wager, a bingo card 534, a bingo number listing 536, a matching of the numbers called with those on a bingo card 534, a determination of a bingo game outcome, and a presentation of an associated award, if any.

A bingo game outcome may be determined by comparing one or more patterns of marked (and/or "daubed) cells of bingo card 534 with a paytable of winning bingo patterns. If bingo card 534 does not include a pattern that matches a pattern in the paytable of winning patterns, then a losing bingo outcome is determined, and no award may be provided to the player. If bingo card 534 does include a pattern that matches a pattern in the paytable of winning patterns, then a winning bingo outcome is determined, and a reward may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player/player account may be awarded for multiple patterns (e.g., all winning patterns) that are matched when bingo card 534 is evaluated against the paytable of winning patterns. In some examples, the player may be awarded for only the highest priority pattern (e.g., the highest paying winning pattern) that is matched. In some examples, during play of a Class II game, a player is provided or selects a single bingo card 534 for multiple plays of the bingo game, with a new bingo number listing 536 generated for each play of the bingo game. Other methods of play of a Class II bingo game, Class III games, and/or other games are also envisioned and are within the scope of this disclosure.

The bingo game outcome may be presented to the player via one or more spinning reel game simulations. In the example of FIG. 5, the spinning reel game is simulated by populating symbols in matrix 504. For each play of the bingo game, the bingo game outcome is presented at least in part as a reel spin outcome in the reel game. In some examples, the spinning reel game simulation may operate by spinning reels associated with the columns and stopping the reels in a particular position to obtain a matrix of symbols.

In the example embodiment, winning outcomes may be displayed as a combination of game outcomes in primary game display area 502 and secondary game display area 532. For example, a total bingo game outcome may be determined, followed by determination of a script or "facade" (terms used interchangeably herein) of base game display patterns/sequences and/or feature game display patterns that, in total, correspond to the determined game outcome (e.g., sequential display of the patterns/sequences of the script results in the desired game outcome being displayed/provided—in some embodiments, patterns/sequences of the script may be arranged/organized in an order from a lowest value to a highest value). In some embodiments, separate bingo game outcome determinations may be made for spins of the electronic game shown in FIGS. 5-10.

In some examples, progressively increasing outputs may be applied to a Class II game as described herein. Game outputs (e.g., credit outputs) may be presented/paid from lowest to highest across a plurality of spins. A number of spins may be determined based upon an amount of a bingo game win or a number of bingo pattern wins, as examples. Sequential display of display patterns/sequences may be controlled until display/communication of a determined number of bingo pattern amounts has been achieved.

In the example embodiment, a game outcome is randomly determined (e.g., by comparing a ball call (e.g., 506) to a bingo card (e.g., 504), by use of an RNG, etc.). A lookup is then performed (e.g., by a game controller and/or based upon an RNG output) in a lookup table (e.g., 322A-N) to determine how to present the total game outcome (e.g., which script/sequence of outcomes to display). FIGS. 5-10 illustrate one particular scripted sequence, for example.

In some embodiments, a random determination may be made to determine which fractions of the total game outcome should be presented by each possible game (e.g., base game, feature game, etc.). For example, an RNG (e.g., RNG 318 and/or 319A-N) and a data structure and/or lookup table (e.g., 322A-N) may be utilized in order to make the determination of how the total game outcome should be split up amongst different game outcomes. In the example of a 100-credit outcome, the lookup table may include any number of fractions/portions/splits between a base game and/or a feature game that sum up to 100 credits. In this example, upon the random determination of how the total game outcome will be split amongst different games (e.g., 30-70, 40-60, etc.), another random determination may be made (e.g., based upon the same or a different lookup table) to determine how to display the respective fractions/portions.

For example, if the determined split is a 30-70 split between a base game and a feature game, there are a plurality of ways to display/communicate a 30-credit base outcome and a 70-credit bonus outcome. Accordingly, one or more next random determinations may be made, based upon the same or a different lookup table, to determine, continuing the example above, which base display sequence (e.g., sequence of spins and displayed symbol outcomes) to use to communicate a 30-credit base outcome and which bonus display sequence (e.g., sequence of spins and displayed symbol outcomes) to use to communicate a 70-credit feature outcome.

For example, the lookup table may be configured as a data structure and/or model such that, based upon an inputted/determined total game outcome amount, a script of which display sequence(s) to use to communicate the game outcome amount (e.g., to a player) may be determined. In some embodiments, an RNG output may be utilized to determine which script to use to communicate a particular game outcome amount. In other words, a total game outcome amount may be determined. Based upon the total game outcome amount, the lookup table can be searched for a set of scripts that correspond to that particular game outcome amount (e.g., the set of scripts may include spins/rounds of a base game, feature game, and/or bonus game, etc.). Then, an RNG output may be utilized to randomly determine which script of the set of scripts associated with the particular game outcome amount to utilize to communicate/convey the game outcome amount.

Figure 10:
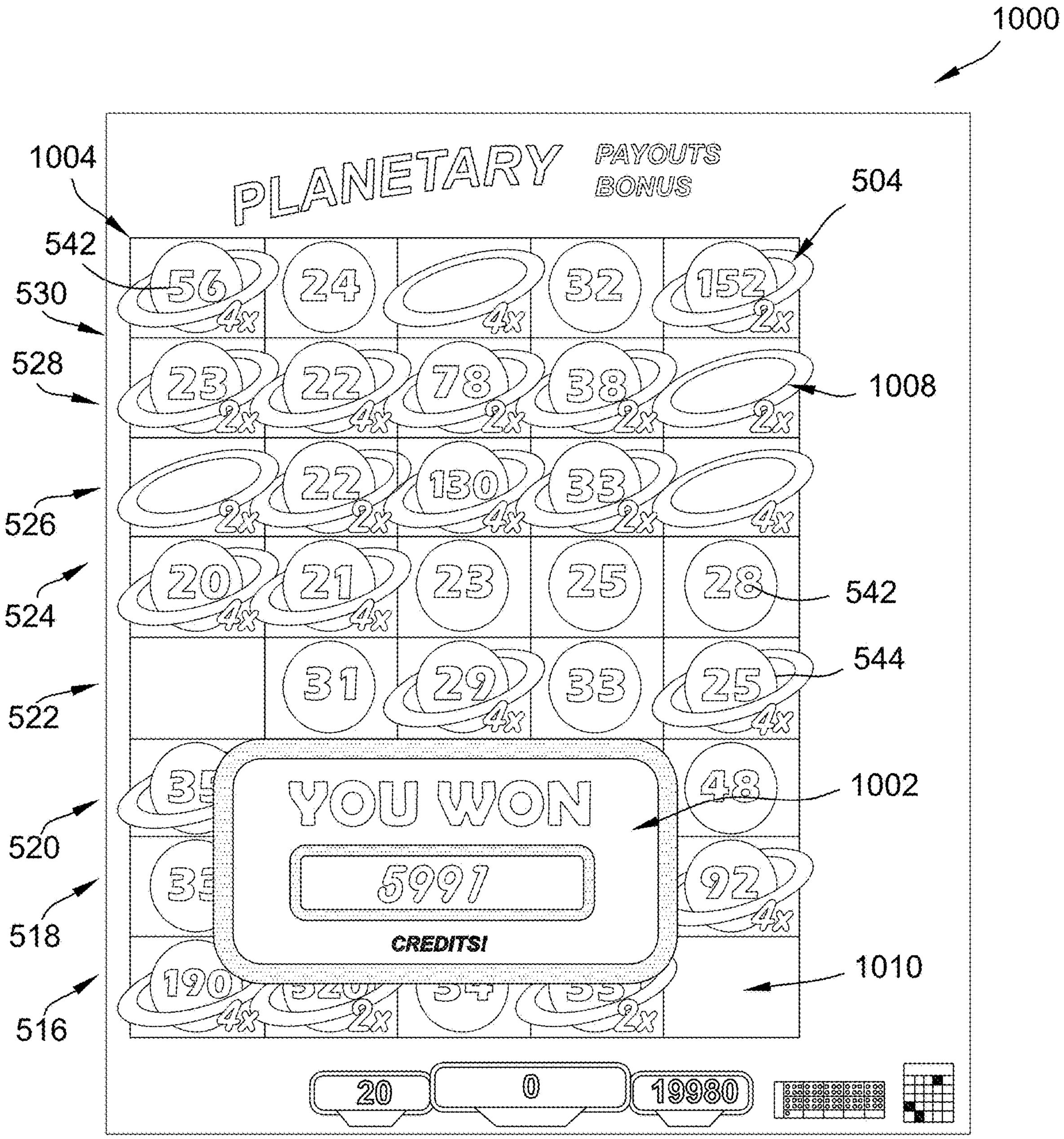
FIG. 10 is an example screen display showing display of a credit award message after the feature game shown in FIG. 5 is ended.

In the example embodiment, the feature game is triggered based on determination of the bingo game outcome and is further based on a number of collectible tokens accumulated by a player during play of the base game. The feature game provides a player with a number of free spins (i.e., game instances that show a simulated spinning of the reels and which do not require independent wagers). After a last spin of the feature game, a credit award is displayed to the player, as shown in FIG. 10. The total credit award corresponds to the award of the bingo game outcome. In other embodiments, the game may be a Class III type game. In such embodiments, one or more outputs of a RNG are used to determine stopping positions of a plurality of reels that are each associated with one of the columns 506-514.

Referring to FIGS. 4 and 5, at a second step 404 of the process 400, the matrix 504 is displayed. As shown in FIG. 5, the matrix 504 includes active symbol positions 538 and inactive symbol positions 540. Each of the symbol positions of the rows 516-520 are active symbol positions 538 and each of the symbol positions of the rows 522-530 are inactive symbol positions 540. The inactive symbol positions 540 are displayed differently from the active symbol positions 538 to indicate that the positions are inactive while still providing visibility of symbols landing in the inactive positions. In the example embodiment the inactive symbol positions 540 are displayed as dimmed or greyed out relative to the active symbol positions 538.

During game play, as described in greater detail below, one or more of the inactive symbol positions 540 may be changed to active symbol positions 538 (also referred to herein as "unlocking") based on the symbol outcomes in the active symbol positions 538. After the last spin of the feature game, symbols appearing in the active symbol positions 538 are indicated as contributing to the credit award while symbols in the inactive symbol positions 540 will remain greyed out, indicating that they do not contribute to the credit award.

In the example embodiment, symbol positions of the matrix 504 are populated for each spin based on a plurality of reels according to a selected one of the scripts. Each of the reels is associated with one of the columns 506-514. The reels each include COR symbols 542, award enhancement symbols 544, and blank symbols (alternatively referred to as "blank spaces").

In the example embodiment, as shown in FIG. 5, prior to the initial spin of the feature game, the matrix 504 is pre-populated (e.g., randomly or according to one of the scripts) with COR symbols 542 and award enhancement symbols 544. In other embodiments, the matrix 504 may be empty (i.e., containing no COR symbols 542 or award enhancement symbols 544) prior to the initial spin.

The COR symbols 542 each include a credit value associated with the respective COR symbol that are displayed within the COR symbols 542. For example, in FIG. 5, a value of "22" credits is displayed in the COR symbol 546. In the example embodiment, the credit values for the COR symbols 542 are fixed on the reels, though in other embodiments they may be dynamic (i.e., randomly assigned using weighting).

The award enhancement symbols 544 enhance a credit award of the COR symbols 542 when a COR symbol 542 and the award enhancement symbol 544 occur in the same symbol position. In particular, in the example embodiment, the award enhancement symbols 544 are multiplier symbols that apply a multiplier (e.g., 2X) to the credit values on the COR symbols 542. The award enhancement symbols 544 are provided on the reels in distinct reel positions from the COR symbols 542 such that, in a given spin, only one of a COR symbol 542, an award enhancement symbol 544, or a blank symbol are assigned to a given symbol position.

COR symbols 542 and award enhancement symbols 544 are each persistent or "sticky" symbols in that, once they land in a given symbol position, they persist in that symbol position for each spin of the free spins feature game. For example, the "22" value COR symbol 546 will be positioned in the same symbol position after a last spin of the feature game as it is before the first spin, as shown in FIG. 11. If the blank symbol lands on a symbol position, the symbol position is not changed in that the symbol position remains empty or remains filled with any corresponding symbols already positioned in the symbol position.

Secondary display area 532 further includes a spin indicator 548 that displays a number of remaining spins in the feature game. In the example embodiment, the spin indicator 548 is initially set to a base number of free spins (e.g., three in the example embodiment) and is decremented by one after each spin of the feature game. The spin indicator 548 may be reset to base number of free spins based on an outcome of a given spin of the feature game. For example, in the example embodiment, the free spin indicator is reset to three spins anytime a new COR symbol 542 is added to one of the active symbol positions 538. After the free spin indicator 548 reaches zero, and is not reset, the feature game is ended and an award for the feature game is determined and displayed to the user.

Game display 500 further includes a plurality of unlock counters 550 that display a number of new COR symbols that are needed to be added to the active symbol positions in the matrix 504 to unlock a given one of the rows 522-530 (i.e., change the symbol positions of the row from an inactive symbol position to an active symbol position).

Figure 6:
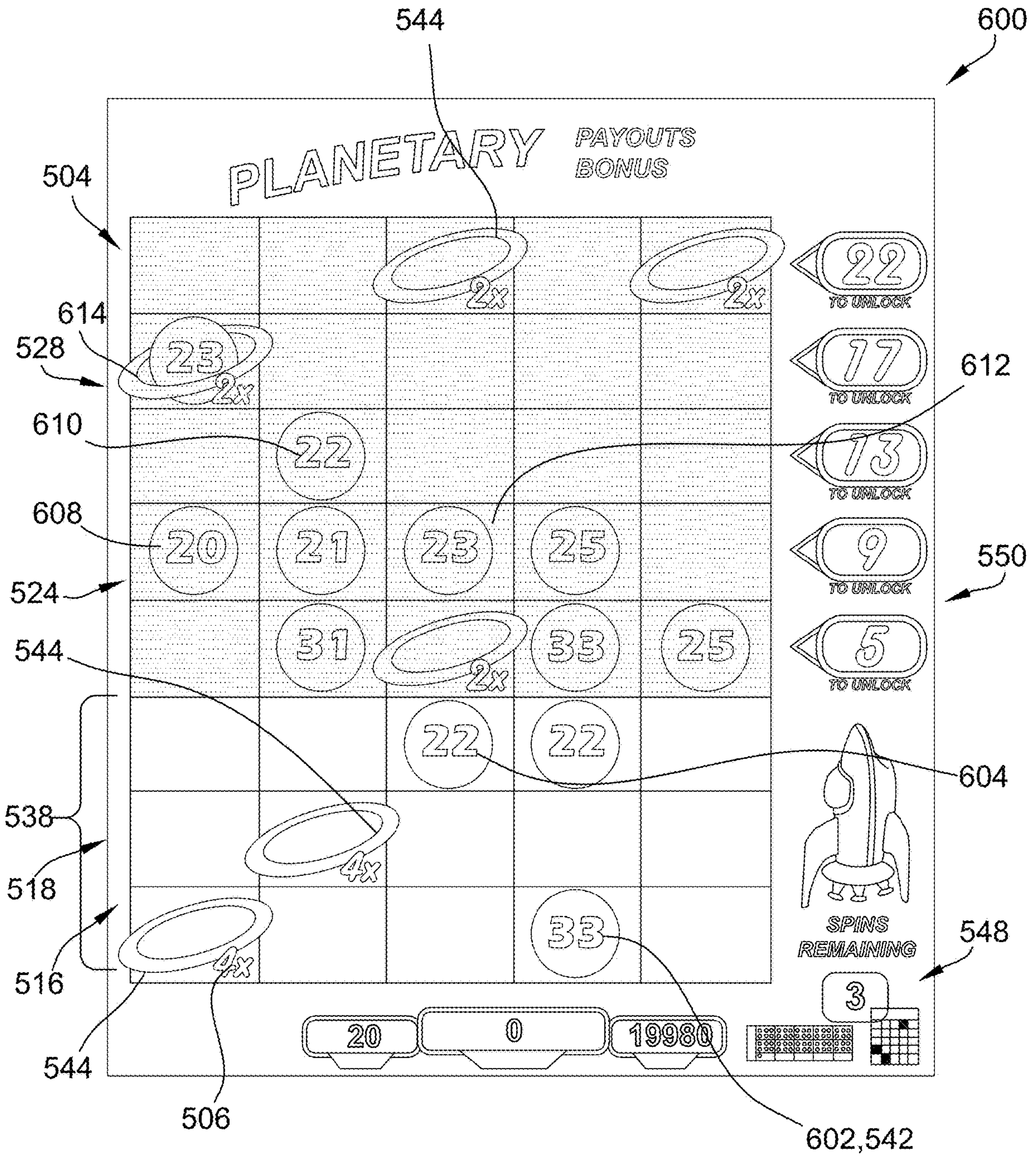
FIG. 6 is an example screen display showing display of an outcome of a first game instance of the feature game shown in FIG. 5.

Referring back to FIG. 4, at step 406, processor causes display of a first game instance by populating a first subset of the plurality of symbol positions with a first plurality of symbols. FIG. 6 shows a game display 600 of a first spin of the feature game in which new COR symbols 602, 604, 606, 608, 610, 612 are added to the symbols previously in the matrix 504 prior to the first spin, as shown in FIG. 5. New award enhancement symbols 544 are further added to the matrix 504. The symbol positions including the new COR symbols 602, 604, 606, 608, 610, 612 and the new award enhancement symbols 544 are collectively a first subset of the symbol positions of the matrix 504.

In the example embodiment, the new symbols are added to both the active symbol positions 538 and the inactive symbol positions 540 for each spin. The symbols to be added are selected from the reels and mapped to corresponding symbol positions of the matrix 504, either according to a preexisting script for Class II embodiments, or based on an RNG output for Class III embodiments. For example, referring to the first column 506, a new award enhancement symbol 614 is added in the first row 516, a new COR symbol 608 is added in the fifth row 524, and a new award enhancement symbol 614 is added in the seventh row 528. The newly added symbols correspond to symbols positioned on at least one first reel that is associated with the first column 506.

In the example embodiment, the symbols are mapped differently to the symbol positions for each spin depending on the type of symbol (e.g., whether the symbol is a COR symbol 542, an award enhancement symbol 544, or a blank symbol) and whether any existing symbol currently occupies the associated symbol position. In particular, where a new COR symbol 542 on the reel overlaps with a preexisting COR symbol 542 that is already displayed in the assigned symbol position, the preexisting COR symbol 542 is still displayed in the outcome and the new COR symbol is not displayed in the outcome.

If a new award enhancement symbol 544 on the reel overlaps with a preexisting award enhancement symbol 544 in the assigned symbol position, the value of the award enhancement symbol 544 is incremented. For example, as shown in FIG. 6, the award enhancement symbols 544 in the first row 516 and second row 518, which were previously present in the matrix 504 before the spin, as shown in FIG. 5, are incremented by a multiple of two from a value of "2λ" to "4λ". This is repeated each time a new award enhancement symbol 542 is assigned to the same symbol positions, such that the multiplier continues to increase from "4×" to "8×", "8×" to "16×," etc. In other embodiments, the preexisting award enhancement symbol 544 may be incremented by adding a value of "2×" (or some other amount, e.g., "1×", "3×", etc.), e.g., increasing the multiplier from "2×" to "4×", "4×" to "6×", etc.

Both the COR symbols 542 and the award enhancement symbols 544 may land in a symbol position that already includes the other symbol type. That is, a new award enhancement symbol 544 may land in any one of: i) a symbol position that includes a only a COR symbol 542; ii) a symbol position that includes only another award enhancement symbol 544; iii) a symbol position that includes both a COR symbol 542 and an award enhancement symbol 544; or iv) a blank symbol position. In instances ii) or iii) the value of the multiplier on the preexisting award enhancement symbol 544 is increased. A new COR symbol 542 may only land in: i) a symbol including an award enhancement symbol 544; or ii) a blank symbol position.

In the example embodiment, the award enhancement symbols 544 are "independently landing" or "independently positionable" (terms used interchangeably herein) in the matrix 504. As used herein, the award enhancement symbols 544 being "independently positionable" in the matrix 504 means that the symbols 544 may be displayed in one of the symbol positions in the matrix 504 independent of any other symbols, such as the COR symbols 542. In effect, such award enhancement symbols 544 do not enhance an award unless a COR symbol 542 is assigned to the corresponding symbol position during play of the feature game. For example, referring to FIG. 6, each of the award enhancement symbols 544 in the first row 516 and the second row 518 are each independently positioned in symbol positions that do not include a COR symbol 542 or any other symbol, and therefore will not provide an award enhancement if and until a COR symbol 542 is added to the corresponding symbol positions. New award enhancement symbols 544 may also be added to symbol positions that already include a COR symbol 542 and/or an award enhancement symbol 544.

In the example embodiment, the unlock counters 550 are further incremented in response to the first spin outcome based on a number of new COR symbols 542 that are added to the active symbol positions 538. Since two new COR symbols 542 are added in the first spin, each of the unlock counters 550 is decremented by a value of two in FIG. 6. Additionally, since at least one new COR symbol is added, the spin indicator 548 is reset to the base number of spins, which is three in the example.

Referring back to FIG. 4, at a fourth step 408 of the process the first plurality of symbols in the first subset are maintained for a second game instance outcome. At a fifth step 410, a second subset of symbol positions are populated with a second plurality of symbols for a second game instance outcome.

Figure 7:
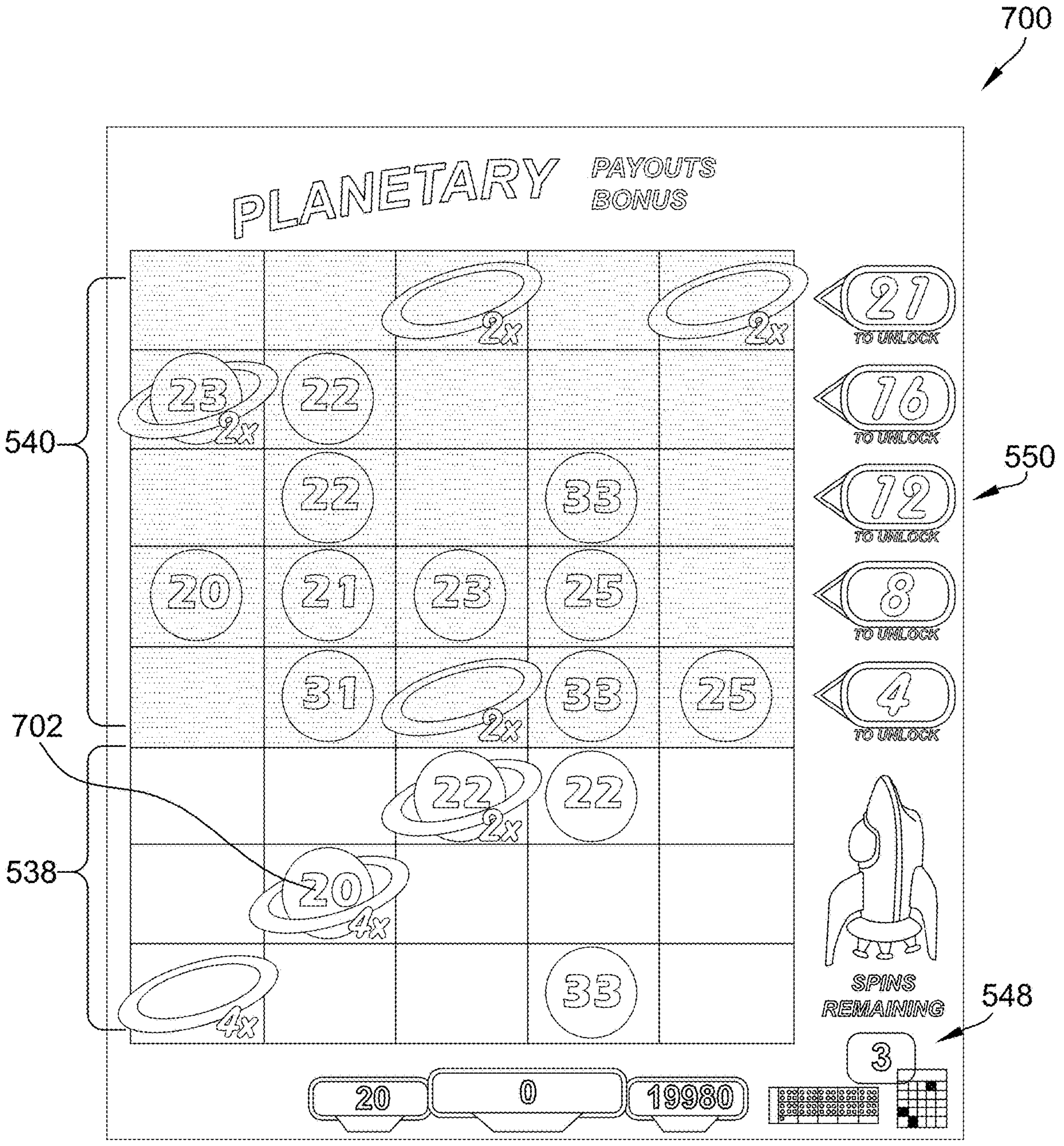
FIG. 7 is an example screen display showing display of another game instance of the feature game shown in FIG. 5.

FIG. 7 shows a game display 700 showing an outcome from a second spin of the feature game, subsequent to the first spin shown in FIG. 6. As shown in FIG. 7, in the active symbol positions 538, a new COR symbol 702 is added to the symbol position that includes the "4×" multiplier award enhancement symbol 544. As a result, each of the unlock counters are decremented by a value of one and the spin indicator 548 is reset to a value of three. Additional symbols have further been added in the inactive symbol positions 540.

Figure 8:
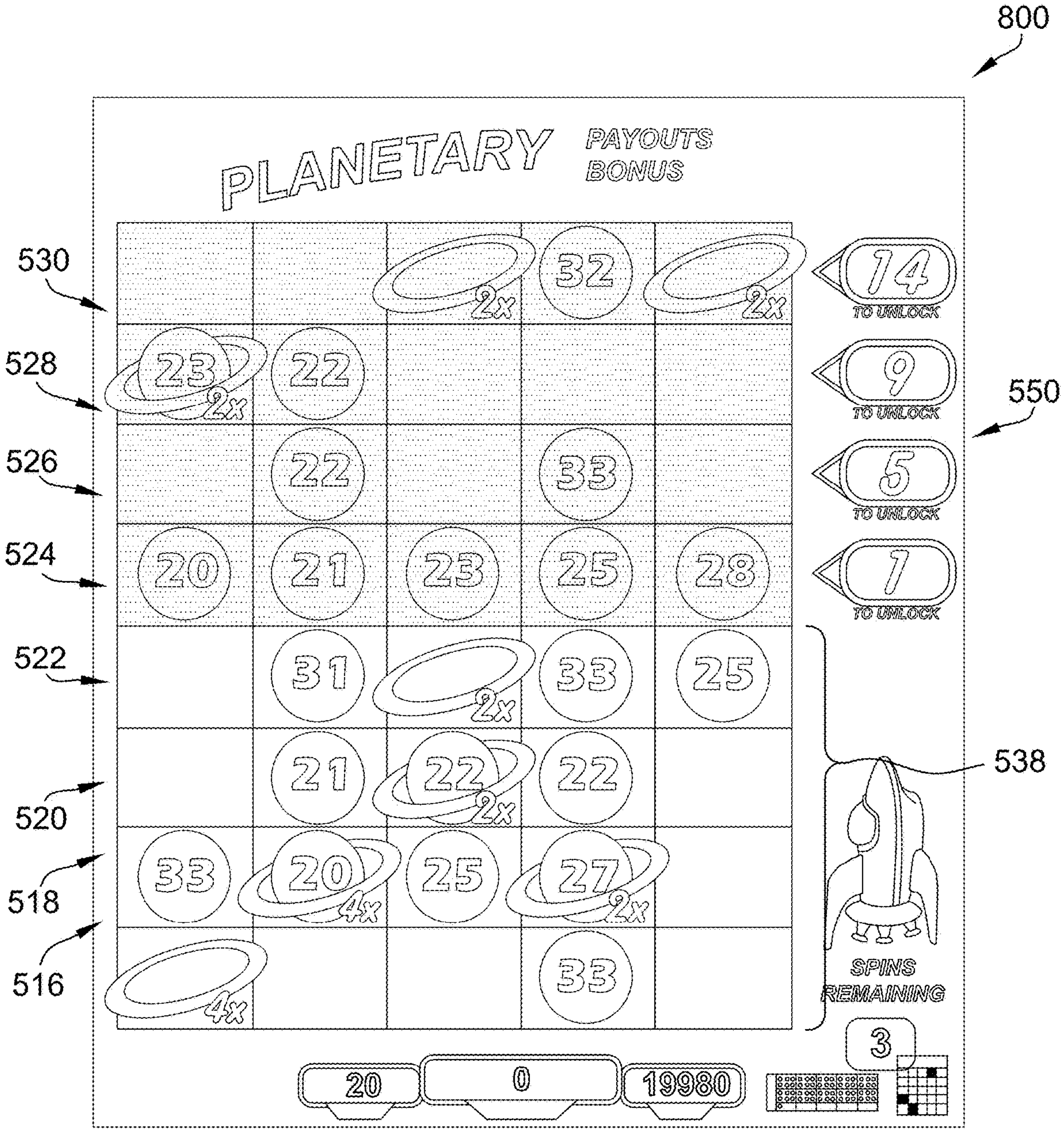
FIG. 8 is an example screen display showing display of another game instance of the feature game shown in FIG. 5.

FIG. 8 shows a subsequent instance in which the fourth row 522 is unlocked. After the fourth row 522 is unlocked, the symbols accumulated within the fourth row 522 over the previous spins contribute to decrementing the unlock counters 550 of the remaining inactive rows 542-530. For example, in FIG. 8, three new COR symbols 542 are added to the active symbols from the fourth row 522. As a result, the unlock counters 550 are each decremented by a value of three for each of the new COR symbols 542 in the fourth row 522 and are further decremented based on any new COR symbols 542 added in the first through third rows 516-520 from the spin of FIG. 8. The gameplay described in FIGS. 5-8 continues until the spin indicator 548 is at a value of zero for a subsequent spin, with the additional rows unlocking as new COR symbols 542 are accumulated in active symbol positions 538.

Figure 9:
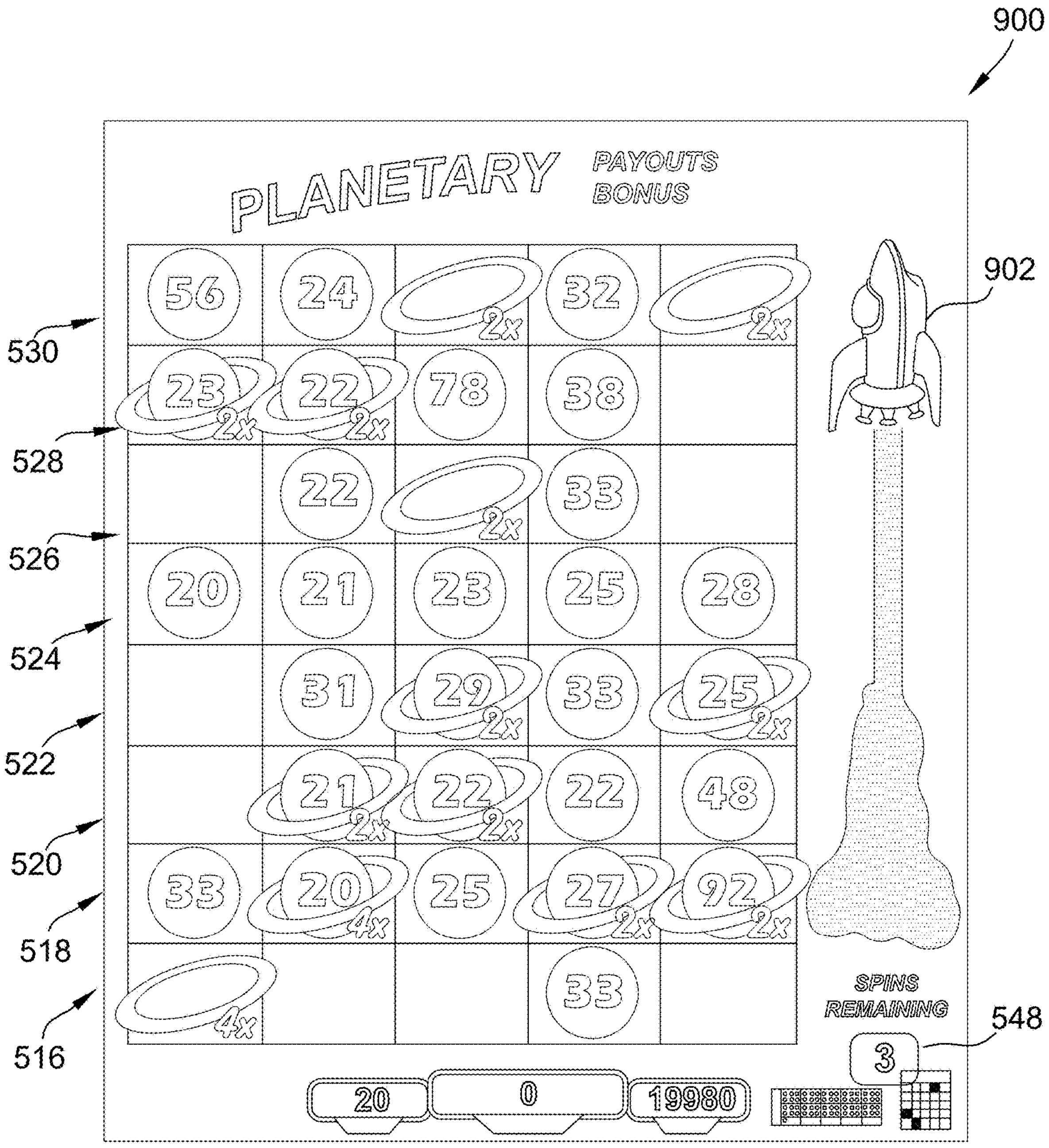
FIG. 9 is an example screen display showing display of another game instance of the feature game shown in FIG. 5.

FIG. 9 shows a game display 900 of a subsequent game instance outcome to the game instance shown in FIG. 8. In the display 900 of FIG. 9, all rows 516 have been unlocked and are indicated as active. In response to all rows being unlocked, a metamorphic graphic 902 is displayed in the form of a rocket ship launching. With all rows unlocked, game play continues until the remaining spins indicated by the spin indicator have been used.

FIG. 10 shows a game display 1000 showing a credit award message 1002 that is displayed after the free spins game is ended, i.e., after the spins indicator 548 reaches zero and a reset is not triggered. As the rows 522-530 are unlocked and the open symbol positions are filled with COR symbols 542, the chance of resetting the spin indicator 548 decreases since resetting of the spins indicator 548 is based on new COR symbols occurring in the spins outcome and new COR symbols 542 only occur in symbol positions that do not otherwise contain COR symbols 542.

After the feature game is ended, processor 204 causes display of the credit award message 1002 for the feature game. The credit award message 1002 includes a credit award for the feature game that is equal to a sum of the values of all active symbol positions, including the value of the displayed COR symbols 542 as modified by any associated multipliers in the matrix 504. For example, for a first symbol position 1004, the COR symbol 542 has a value of "56" and a multiplier of "4×". The associated credit value for the first symbol position 1004 is equal to 56 multiplied by 4, or 224. The total credit award of "5,991" displayed in the credit award message 1002 is based on the sum of the total values of all active symbol positions in the matrix 504 that include a COR symbol 542. Symbol positions that only include an award enhancement symbol 544, such as symbol position 1008 or are blank (i.e., that do not include a COR symbol), such as symbol position 1010, do not add to the final credit value of the feature game.

The game displays shown in FIGS. 5-10 show a single non-limiting iteration of the feature game described herein. In other iterations, the feature game may be ended before one or more of the initially inactive rows 522-530 are unlocked. In such embodiments, the credit award corresponds to the sum of the values of only the active symbol positions 538 and does not include values of symbols that are displayed as inactive symbol positions 540.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming system comprising:

a processor; and a memory storing instructions thereon wherein the instructions when executed by the processor, cause the processor to:

cause display of a matrix including a plurality of symbol positions;

populate a first subset of the symbol positions with a first plurality of symbols from a plurality of reels for a first game instance outcome, each reel of the plurality of reels being associated with a corresponding column of the matrix, the first game instance outcome including a first award enhancement symbol from a first reel of the plurality of reels independently positioned in a first symbol position of the plurality of symbol positions;

maintain the first plurality of symbols in the first subset for a second game instance outcome;

populate a second subset of the symbol positions with a second plurality of symbols from the plurality of reels for a second game instance outcome, the second game instance outcome including the first award enhancement symbol in the first symbol position in combination with a cash-on-reel symbol from the second plurality of symbols; and cause display of an upgrading of the first award enhancement symbol in response to a second award enhancement symbol from the plurality of reels occurring in the first symbol position for a third game instance outcome.

2. The gaming system of claim 1, wherein the first game instance and second game instance are each game instances of a feature game, wherein the instructions further cause the processor to:

determine an award of the feature game; and cause display of a credit award of the feature game.

3. The gaming system of claim 2, wherein the instructions further cause the processor to:

determine a last game instance of the feature game;

cause display of the last game instance outcome of the feature game; and cause display of a spins counter decreasing in value for each game instance, wherein, after the last game instance of the feature game, the spins counter is set to zero and the credit award is displayed.

4. The gaming system of claim 3, wherein the last game instance outcome includes a plurality of COR symbols and a plurality of award enhancement symbols displayed in the plurality symbol positions, each symbol position of the plurality of symbol positions having a symbol position value, and wherein the credit award is equal to a sum of each symbol position value.

5. The gaming system of claim 1, wherein populating the first symbol position with the first award enhancement symbol includes display of a multiplier value.

6. The gaming system of claim 1, wherein the first award enhancement symbol is a multiplier symbol including a multiplier value, and wherein instructions further cause the processor to:

display the multiplier value in the first symbol position in connection with the first award enhancement symbol for the first game instance outcome;

determine that a second award enhancement symbol will occur in the first symbol position for a subsequent game instance outcome; and change the multiplier value for the subsequent game instance outcome.

7. The gaming system of claim 1, wherein the matrix includes a plurality of active symbol positions and a plurality of inactive symbol positions for the first game instance outcome, and wherein an award for the game is equal to a sum of credit values of each symbol position of the plurality of active symbol positions and does not include values of the inactive symbol positions.

8. The gaming system of claim 7, wherein the instructions further cause the processor to change at least one inactive symbol position of the plurality of inactive symbol positions to an active symbol position for the second game instance outcome based on the second plurality of symbols occurring in the second game instance outcome.

9. The gaming system of claim 7, wherein the instructions further cause the processor to:

cause display of an unlock counter associated with at least one inactive symbol position;

determine that a new cash-on-reel symbol is displayed in the plurality of active symbol positions for the second game instance outcome;

change, in response to the determination, display of the unlock counter; and change, in response to the determination, at least one inactive symbol position to the active symbol position.

10. The gaming system of claim 1, wherein the first game instance and second game instance are each game instances of a feature game, and wherein the instructions further cause the processor to:

cause display of a last game instance outcome of the feature game; and determine that a second symbol position of the plurality of symbol positions includes an award enhancement symbol and does not include a cash-on-reel symbol, wherein an associated award value of the second symbol position after the last game instance outcome is zero credits.

11. The gaming system of claim 1, wherein the first reel includes each of: a cash-on-reel symbol, an award enhancement symbol, and a blank symbol.

12. A non-transitory computer-readable media containing instructions embodied thereon which, when executed by a processor, cause the processor to:

cause display of a matrix including a plurality of symbol positions;

populate a first subset of the symbol positions with a first plurality of symbols from a plurality of reels for a first game instance outcome, each reel of the plurality of reels being associated with a corresponding column of the matrix, the first game instance outcome including a first award enhancement symbol from a first reel of the plurality of reels independently positioned in a first symbol position;

maintain the first plurality of symbols in the first subset for a second game instance outcome;

populate a second subset of the symbol positions with a second plurality of symbols from the plurality of reels for a second game instance outcome, the second game instance outcome including the first award enhancement symbol in the first symbol position in combination with a cash-on-reel symbol from the second plurality of symbols; and cause display of an upgrading of the first award enhancement symbol in response to a second award enhancement symbol from the plurality of reels occurring in the first symbol position for a third game instance outcome.

13. The non-transitory computer-readable media of claim 12, wherein the first game instance and second game instance are each game instances of a feature game, wherein the instructions further cause the processor to:

determine an award of the feature game; and cause display of a credit award of the feature game.

14. The non-transitory computer-readable media of claim 13, wherein the instructions further cause the processor to:

determine a last game instance of the feature game;

cause display of the last game instance outcome of the feature game; and cause display of a spins counter decreasing in value for each game instance, wherein, after the last game instance of the feature game, the spins counter is set to zero and the credit award is displayed.

15. The non-transitory computer-readable media of claim 14, wherein the last game instance outcome includes a plurality of COR symbols and a plurality of award enhancement symbols displayed in the plurality of symbol positions, each symbol position of the plurality of symbol positions having a symbol position value, and wherein the credit award is equal to a sum of each symbol position value.

16. The non-transitory computer-readable media of claim 12, wherein the first award enhancement symbol is a multiplier symbol including a multiplier value, and wherein instructions further cause the processor to:

display the multiplier value in the first symbol position in connection with the first award enhancement symbol for the first game instance outcome;

determine that a second award enhancement symbol will occur in the first symbol position for a subsequent game instance outcome; and change the multiplier value for the subsequent game instance outcome.

17. The non-transitory computer-readable media of claim 12, wherein the matrix includes a plurality of active symbol positions and a plurality of inactive symbol positions for the first game instance outcome, and wherein an award for the game is equal to a sum of credit values of each symbol position of the plurality of active symbol positions and does not include values of the inactive symbol positions.

18. A method of implementing a game comprising:

causing display of a matrix including a plurality of symbol positions;

populating a first subset of the symbol positions with a first plurality of symbols from a plurality of reels for a first game instance outcome, each reel of the plurality of reels being associated with a corresponding column of the matrix, the first game instance outcome including a first award enhancement symbol from a first reel of the plurality of reels independently positioned in a first symbol position;

maintaining the first plurality of symbols in the first subset for a second game instance outcome;

populating a second subset of the symbol positions with a second plurality of symbols from the plurality of reels for a second game instance outcome, the second game instance outcome including the first award enhancement symbol in the first symbol position in combination with a cash-on-reel symbol from the second plurality of symbols; and causing display of an upgrading of the first award enhancement symbol in response to a second award enhancement symbol from the plurality of reels occurring in the first symbol position for a third game instance outcome.

19. The method of claim 18, wherein the first award enhancement symbol is a multiplier symbol including a multiplier value, the method further comprising:

displaying the multiplier value in the first symbol position in connection with the first award enhancement symbol for the first game instance outcome;

determining that a second award enhancement symbol will occur in the first symbol position for a subsequent game instance outcome; and changing the multiplier value for the subsequent game instance outcome.

20. The method of claim 18, wherein the matrix includes a plurality of active symbol positions and a plurality of inactive symbol positions for the first game instance outcome, and wherein an award for the game is equal to a sum of credit values of each symbol position of the plurality of active symbol positions and does not include values of the inactive symbol positions, the method further comprising:

causing display of an unlock counter associated with at least one inactive symbol position;

determining that a new cash-on-reel symbol is displayed in the plurality of active symbol positions for the second game instance outcome;

changing, in response to the determination, display of the unlock counter; and changing, in response to the determination, at least one inactive symbol position to the active symbol position.

* * * * *